Patented Aug. 22, 1933

1,924,028

UNITED STATES PATENT OFFICE 1,924,028

MANUFACTURE OF FOUNDRY MOLDS

Jean Baptiste Durand, Marseilles, France

No Drawing. Application September 21, 1929, Serial No. 394,387, and in France September 29, 1928

14 Claims. (Cl. 22—188)

The present invention relates to a composition having a sand basis for the preparation of molds, also to a process for the manufacture of the molds and to the molds manufactured according to the said process.

In the manufacture of molds for foundries it has hitherto been necessary to have the molds set up by specialized molders whose skill is required in order to obtain good adherence and binding of the sand and a smooth surface in the mold. The molds have to be reinforced at certain places and they are generally supported in molding boxes. The necessary cores cannot be made of the same material as the part of the mold which is intended to contain the said cores and again, for the manufacture of these cores earthy material is used. These preliminary constructions for the molding operation must be dried in drying chambers, and the cores baked in stoves or ovens. This occasions a loss of time and increased expenses for material and workmanship. It is likewise necessary to dry the sand before the preparation of the molds.

The present invention consists in a process of making a composition having a sand basis for use particularly in making molds for the molding of metals which are cast in a melted condition, and also in the molds manufactured according to the said process. The term "mold" is intended to include not only the external part of a mold, but also the cores which are inserted into it if necessary. The new sand-composition according to the invention is made by mixing pure silicious or argillaceous foundry sand or even silicocalcareous sand and a hydraulic binder, for example, a binder of cement or of lime. The agglomeration of materials can, however, be effected by means of ordinary commercial but subhydrated cement. Good results are likewise obtained with fine artificial Portland cements commonly used in the reinforced concrete works, which cements have been ground very small.

The molding sand is simply mixed in the dry state with cement and water is added in such proportion that the mixture does not become pasty or plastic, but always stays subhydrated, i. e. the proportion of water is such that a part of the cement, mixed with the sand, does not set. When taken in the hand this cement-sand mixture is just coherent enough to form a highly friable ball. For example, the proportions used for the pure silicious sand containing 97% of silica ($SiO^2$) and the ordinary Portland cement of the quality employed in reinforced concrete are on the average five parts of sand to one part of cement, the parts being reckoned by volume.

These proportions can be varied according to the degree of resistance possessed by the molds which it is desired to obtain, but always taking care that the mixture is sub-hydrated.

The mixture thus prepared is employed in the usual manner in dismountable wooden molding boxes for molding in earth or in metallic frames. It is only necessary to ram or press it down slightly, the pressure of the fingers being sufficient in most cases. The mixture when sufficiently hydrated though sub-hydrated renders possible an immediate drawing out of the pattern and maintains itself in position even on the vertical faces without variation of shape. The molds thus obtained are left to bind or set for several hours.

In the case of the mixture composition above indicated, the molds can be handled without special care in about six hours after use, this being the average time of setting.

The elimination of the ramming operation which is usual in other types of sand compositions or the like enables a considerable porosity to be obtained which, in conjunction with the removal of most of the water of hydration by chemical combination with the binder, renders it possible to cast without fear of boiling or bubbling occurring.

Furthermore, after the molding operation and the time for setting has terminated, the molds can be painted by means of a brush or a sprayer with one or two layers of known black water paint, without there being any need to stove them before the casting operation.

In the case of work pieces in which the manipulatory operation, the placing in position of the cores and the closing of the molds involves the risk of detaching particles from the surface of the mixture, a coat of paint or plaster composed of finely ground cement and water is applied by means of a brush.

Good results are obtained with a finely ground aluminous cement of high quality such as that which is known on the French market under the name of "cement fondu" (molten cement).

The sand, cement and water mixtures above mentioned may also be employed with prefect results in the manufacture of the cores. After having been provided with one or more liquid coatings, they may be placed in the molds even without being stoved, due to the sub-hydrated state of the mixture.

The mixture, the process of manufacture of the molds, and the molds obtained render it possible to dispense with the employment of specialized expert molders, inasmuch as the skill necessary for assembling and properly binding the sand and smoothing the molds is rendered unnecessary. Moreover, not only the sub-hydrated state but also the porosity of the molds thus prepared renders all stoving operations superfluous.

Apart from this the following advantages are obtained:

The simplification of the molding owing to the fact that the sand hardens of itself without its strength being increased by a preliminary ramming operation.

The elimination of the stoving operation owing to the chemical removal of the water by hydration of the binding means in the preparation of the mixture and the setting thereof renders possible the absorption and chemical removal of the water contained in the layers which are applied to the molds and causes the moisture to be taken up by combination.

The accurate retention of the shape of the molds owing to the elimination of contraction and deterioration of the sand.

The employment of unskilled employees.

The elimination of the foundry flasks.

The possibility of using for the cores the same sand-composition as that employed for the external part or main body of the mold.

From what has been stated above it will be understood that an essential feature of this invention is the use of only so much water as will keep the mixture always in a sub-hydrated state and not permit it to become pasty or plastic, the result being that it becomes possible to pour molten metal into the molds without the occurrence of boiling or bubbling. This calls for an upper limit of hydration considerably below the lower limit thereof prescribed according to the usual practice in making similar compositions, and below the limit commonly prescribed for the purpose of causing the hydraulic binder to set completely. As to the lower limit of hydration according to the present invention it is only necessary to see that water is used in sufficient quantity to avoid a too friable condition of the mixture for convenient handling.

I claim:

1. A composition of matter, consisting in an agglomeration of sand, a hydraulic binder and water in such a quantity as necessary to conserve a subhydrated state.

2. A composition of matter, consisting in an agglomeration of dry sand, a dry hydraulic binder and such a quantity of water of hydration that the mixture does not become pasty.

3. A composition of matter, consisting in a subhydrated agglomeration of sand and cement.

4. A process for the manufacture of molds and cores for foundries consisting in mixing sand and a hydraulic binder with only so much water that the mixture remains sub-hydrated, placing said composition in a mold box, molding and ramming it lightly therein.

5. A process for the manufacture of molds and cores for foundries consisting in mixing sand and a hydraulic binder with only so much water that the mixture remains sub-hydrated, placing said mixture in a mold box, molding and ramming it lightly therein, and painting the mold after the molding operation with at least one coat of paint containing water thereby permitting use of the mold without drying.

6. A process for the manufacture of molds and cores for foundries consisting in mixing sand and a hydraulic cement with only so much water that the mixture remains sub-hydrated placing said mixture in a mold box, molding, ramming it lightly therein and painting the mold after molding with at least one coat of a finely ground cement and water.

7. A mold for foundries consisting of a mixture of sand, set hydraulic binder and non-set hydraulic binder.

8. A mold for foundries consisting of a mixture of sand, set cement and non-set cement.

9. A mold for foundries consisting of a mixture of sand, finely ground portland set cement and finely ground non-set portland cement.

10. A mold for foundries consisting of a sub-hydrated mixture of five parts of sand to one part of set and non-set cement, the parts being reckoned by volume.

11. A mold for foundries consisting of a sub-hydrated mixture of sand and cement, characterized by a high degree of porosity such that boiling and bubbling do not occur when molten metal is poured therein.

12. A process for casting metal pieces, which consists in mixing sand and a hydraulic binder with only so much water that the mixture remains subhydrated, placing said composition in a mold box containing a pattern, ramming it lightly therein and casting the metal when the hydraulic binder has set and without drying the mold.

13. A process for casting metal pieces, which consists in mixing sand and a hydraulic binder with only so much water that the mixture remains subhydrated, placing said composition in a mold box containing a pattern, ramming it lightly, painting the mold after the molding operation with at least one coat of finely ground cement and water and casting the metal when the hydraulic binder has set and without drying the mold.

14. A composition of matter consisting of a subhydrated mixture of five parts of sand to one part of cement, the parts being reckoned by volume.

JEAN BAPTISTE DURAND.